United States Patent
Fierro et al.

(10) Patent No.: US 7,364,717 B2
(45) Date of Patent: Apr. 29, 2008

(54) PROCESS FOR CONVERTING NICKEL TO NICKEL SULFATE

(75) Inventors: Cristian Fierro, Northville, MI (US); Gabriel E. Benet, Angola, IN (US); Avram Zallen, West Bloomfield, MI (US); Tim Hicks, Redford, MI (US); Michael A. Fetcenko, Rochester, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 417 days.

(21) Appl. No.: 10/727,413

(22) Filed: Dec. 4, 2003

(65) Prior Publication Data

US 2005/0123469 A1    Jun. 9, 2005

(51) Int. Cl.
*C01B 17/96* (2006.01)
(52) U.S. Cl. .................... 423/544; 423/146; 423/150.5
(58) Field of Classification Search .............. 423/41, 423/146, 150.4, 150.5, 544, 594.19
See application file for complete search history.

(56) References Cited

U.S. PATENT DOCUMENTS

| | | | | |
|---|---|---|---|---|
| 1,936,829 A | * | 11/1933 | Corson | 423/150.5 |
| 3,962,051 A | * | 6/1976 | Symens et al. | 205/584 |
| 4,201,648 A | * | 5/1980 | Subramanian et al. | 205/589 |
| 4,323,541 A | * | 4/1982 | Saarinen et al. | 423/37 |
| 5,628,817 A | * | 5/1997 | Fugleberg et al. | 75/743 |
| 6,432,580 B1 | * | 8/2002 | Fierro et al. | 429/223 |

OTHER PUBLICATIONS

Elementary principles of chemical processes, p. 106, 1978, no month.*

\* cited by examiner

*Primary Examiner*—Steven Bos
(74) *Attorney, Agent, or Firm*—David W. Schumaker

(57) ABSTRACT

A preferred embodiment of the present invention provides a process for making nickel sulfate by converting nickel metal into nickel sulfate, which may be converted to nickel hydroxide. Nickel metal is dissolved in sulfuric acid and oxygen containing gas is introduced to produce a nickel sulfate solution having nickel sulfate and water as illustrated in the following chemical equation.

$$Ni + H_2SO_4 + \tfrac{1}{2}O_2 \rightarrow NiSO_4 + H_2O$$

The nickel sulfate is filtered and sulfuric acid is continually added to maintain stoichiometry within a reactor until the nickel metal is dissolved. The sulfuric acid, oxygen containing gas and nickel metal may be heated to facilitate the desired reaction. Then, the nickel sulfate may be utilized to produce nickel hydroxide.

21 Claims, 7 Drawing Sheets

PROCESS FOR CONVERTING NICKEL TO NICKEL SULFATE

FIELD OF THE INVENTION

The present invention pertains to a process of making nickel hydroxide produced from nickel sulfate produced from nickel metal. More specifically, the present invention involves dissolving nickel metal in sulfuric acid and introducing oxygen into the system to create a reaction in which a nickel sulfate solution is produced. Further, the nickel sulfate may be used to produce nickel hydroxide.

BACKGROUND OF THE INVENTION

The demand for batteries has grown dramatically over the past decade and continues to grow at a phenomenal rate. Rechargeable batteries with high energy density and high capacity are particularly desirable. Two types of batteries that are widely used are the Ni—Cd (nickel cadmium) type and the more desirable Ni-MH (nickel metal hydride) type. These batteries have a positive and negative electrode. In both types of batteries the positive electrodes are made primarily of nickel hydroxide active material.

Ni-MH cells utilize a negative electrode that is capable of the reversible electrochemical storage of hydrogen. Ni-MH cells usually employ a positive electrode of nickel hydroxide material. The negative and positive electrodes are spaced apart in an alkaline electrolyte. Upon application of an electrical potential across a Ni-MH cell, the Ni-MH material of the negative electrode is charged by the electrochemical absorption of hydrogen and the electrochemical discharge of a hydroxyl ion, as shown in equation 1.

$$M + H_2O + e^- \leftrightarrows M\text{-}H + OH^- \qquad (1)$$

The negative electrode reactions are reversible. Upon discharge, the stored hydrogen is released to form a water molecule and release an electron.

The reactions that take place at the nickel hydroxide positive electrode of a Ni-MH cell are shown in equation 2.

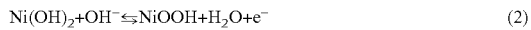

$$Ni(OH)_2 + OH^- \leftrightarrows NiOOH + H_2O + e^- \qquad (2)$$

The use of nickel hydroxide, $Ni(OH)_2$, as a positive electrode material for batteries is generally known. See for example, U.S. Pat. No. 5,523,182, issued Jun. 4, 1996 to Ovshinsky et al., entitled "Enhanced Nickel Hydroxide Positive Electrode Materials For Alkaline Rechargeable Electrochemical Cells", the disclosure which is hereby incorporated herein by reference.

Several forms of positive electrodes exist at the present and include sintered, foamed, and pasted electrode types. Processes for making positive electrodes are generally known in the art, see for example U.S. Pat. No. 5,344,728 issued to Ovshinsky et al., the disclosure of which is herein incorporated by reference, where capacity in excess of 560 mAh/cc was reported. The particular process used can have a significant impact on an electrode's performance. For example, conventional sintered electrodes normally have an energy density of around 480-500 mAh/cc. Sintered positive electrodes are constructed by applying nickel powder slurry to a nickel-plated, steel base followed by sintering at high temperature. This process causes the individual particles of nickel to weld at their points of contact, resulting in a porous material that is approximately 80% open volume and 20% solid metal. This sintered material is then impregnated with active material by soaking it in an acidic solution of nickel nitrate, followed by the conversion to nickel hydroxide by reaction with an alkali metal hydroxide. After impregnation, the material is subjected to electrochemical formation.

To achieve significantly higher loading, the current trend has been away from sintered positive electrodes and toward pasted electrodes. Pasted electrodes consist of nickel hydroxide particles in contact with a conductive network or substrate, most commonly foam nickel. Several variants of these electrodes exist and include plastic-bonded nickel electrodes, which utilize graphite as a microconductor, and pasted nickel fiber electrodes, which utilize spherical nickel hydroxide particles loaded onto a high porosity, conductive nickel fiber or nickel foam support.

The production of low cost, high capacity nickel hydroxide is critical to the future commercialization of Ni-MH batteries. As with electrode formation, the properties of nickel hydroxide also differ widely depending upon the production method used. Generally, nickel hydroxide is produced using a precipitation method in which a nickel salt, such as nickel sulfate and a hydroxide salt are mixed together followed by the precipitation of nickel hydroxide. Active, nickel hydroxide material preferably has high capacity and long cycle life, see U.S. Pat. No. 5,348,822 to Ovshinsky et al., the disclosure of which is herein incorporated by reference.

It has been discovered that nickel hydroxide suitable for use in a battery electrode should have an apparent density of 1.4-1.7 $g/cm^3$, a tap density of about 1.8-2.3 $g/cm^3$, and a size range of about 5-50 μm. Active, nickel hydroxide particles are preferably spherical in shape with a high packing density and a narrow size distribution Preferably, average particle size should be about 10 μm and tap density should be about 2.2 g/cc. Paste made with this kind of nickel hydroxide has good fluidity and uniformity, and thus it is possible to fabricate high capacity, uniformly loaded electrodes. The use of this kind of nickel hydroxide also improves the utilization of the active material and discharge capacity of the electrode. If the process is not carefully controlled, the precipitate will have an irregular shape and/or low tap density. For example, if the rate of reaction is too fast, the precipitate formed may be too fine and the density too low. A fine powder with low density requires longer filtering or washing times and increases the adsorption of water on the surface. Further, if the precipitated particles have too wide a size distribution (ranging from 1 to hundreds of microns), the nickel hydroxide may require pulverization to render it useful. Electrodes formed with low-density nickel hydroxide will lack high capacity and high energy density. For these reasons and others, an active powder having an irregular shape and/or low density is less than desirable for use as a high capacity battery electrode material.

In order to produce high density, substantially spherical nickel hydroxide, particles are gradually grown under carefully controlled process conditions. A nickel salt provided in solution is combined with an ammonium ion. The nickel salt forms complex ions with ammonia to which caustic is added. Nickel hydroxide is then gradually precipitated by decomposition of the nickel ammonium complex. The reaction rate is difficult to control, so methods have been introduced to separate critical steps in the production process to compensate for said difficulties. For example, U.S. Pat. No. 5,498,403, entitled "Method for Preparing High Density Nickel Hydroxide Used for Alkali Rechargeable Batteries", issued to Shin on Mar. 12, 1996, the disclosure of which is herein incorporated by reference, discloses a method of preparing nickel hydroxide from a nickel sulfate solution using a separate or isolated amine reactor. Nickel sulfate is mixed with ammonium hydroxide in the isolated amine reactor to form a nickel ammonium complex. The nickel ammonium complex is removed from the reactor and sent to a second mixing vessel or reactor where it is combined with a solution of sodium hydroxide to obtain nickel hydroxide. Such a method relies heavily on a raw material source of very high purity or what is termed throughout the ensuing specification as primary nickel.

Thus, particular notice should be taken in the fact that all of present day processes for making positive electrode materials, such as those described above, have utilized expensive, high grade, and highly pure primary nickel for the production of nickel salt starter solutions. As modern process technology and automation have reduced the cost of labor in the production of battery electrode materials, the cost of primary nickel and its associated salts have become a significant factor in determining the cost of active electrode materials, battery electrodes, and the batteries the electrodes are placed within, making up as much as 60% of the direct manufacturing cost of the final nickel hydroxide.

Primary nickel used for the production of active materials is typically derived from the ores of nickel sulfide and nickel oxide and purified by electro-processes. Nickel sulfide ores are refined by flotation and roasting to nickel oxide. Nickel oxide ores are typically refined by hydrometallurgical refining, such as leaching with ammonia. Refined nickel ore is usually cast into nickel anodes for distribution as primary nickel. The highly pure, primary nickel may then be dissolved into solution, such as a sulfate solution, and sold as highly pure aqueous nickel sulfate, with a frequent end use also being nickel electroplating and electroless nickel plating.

The average amount of nickel estimated to be present in the earth's crust is only about 0.0084 wt %, as reported on page 14-14 of the Handbook of Chemistry and Physics, 78th Edition, 1997-1998. Because nickel is used for many things, including the production of stainless steel, the demand for nickel is very high, making it a relatively expensive metal. Although primary nickel is a commodity product, it is subject to wild market swings in price. For example, during the period of Jun. 1, 1999 through Jun. 1, 2000, nickel prices have seen dramatic volatility having a low of 2.16 $/lb and a high of 4.77 $/lb as reported on the London Metal Exchange. As a means of off-setting or hedging against the increasing cost of nickel, a number of large producers of nickel hydroxide have gone so far as to purchase ownership interests in nickel mines. Smaller manufactures of nickel hydroxide, unable to offset rising nickel prices, have been left at a competitive disadvantage.

Current processes for the production of nickel sulfate (NiSO$_4$) involve dissolving nickel powder in sulfuric acid (H$_2$SO$_4$) to produce nickel sulfate liquid and hydrogen gas, as shown in equation 3:

$$Ni+H_2SO_4 \rightarrow NiSO_4+H_2 \quad (3)$$

However, this process must be conducted in a very secure environment, due to the volatility of hydrogen gas. This volatility of hydrogen gas creates a hazardous environment. Additionally, nickel powder (particles less than 0.1 mm) is expensive when compared to bulk nickel (particles greater then 0.1 mm).

Currently, there exists a long felt and presently unfulfilled need for a cost effective and safe method for producing nickel hydroxide that may utilize bulk nickel metal as the nickel source. Further, there exists a need for a cost effective process for making nickel sulfate from nickel, wherein hydrogen gas is not liberated into the atmosphere as a byproduct.

SUMMARY OF THE INVENTION

The invention disclosed herein provides a process for converting nickel metal to nickel sulfate solution which may be used to produce nickel hydroxide, the process comprising a continuous chemical reaction of sulfuric acid, nickel, and oxygen containing gas, such as O$_2$ gas, air or a mixture thereof. First, at least one reactor, preferably a reactor column, is loaded with nickel metal. Any size nickel may be used. Preferably, bulk nickel having an average size from about 0.1 mm to about 50 mm is used. Preferably, the sulfuric acid is introduced at a pressure above ambient pressure to facilitate the reaction. Oxygen containing gas is introduced into a sulfuric acid flow, preferably at a pressure above the pressure of sulfuric acid solution. Next, the sulfuric acid and oxygen are introduced to each reactor column. The sulfuric acid solution and oxygen contacts the nickel metal to produce nickel sulfate solution having nickel sulfate and water with the chemical reaction as follows:

$$Ni+H_2SO_4+\tfrac{1}{2}O_2 \rightarrow NiSO_4+H_2O$$

However, the oxygen containing gas may be added to the system after the sulfuric acid has been added to the reactor(s) to dissolve the nickel, to achieve the same reaction above. The nickel sulfate is filtered and sulfuric acid is continually added to maintain stoichiometry within the container until all the nickel metal is dissolved. The nickel sulfate solution and water are collected and the water is separated from the nickel sulfate solution, preferably by evaporating the water. The nickel sulfate solution may be diluted or concentrated to a desired value by adding or removing water. The nickel sulfate solution may then be used to produce nickel hydroxide.

The present invention discloses a process for the production of nickel hydroxide comprising providing at least one enclosed reactor, preferably a reactor column, containing nickel then introducing sulfuric acid at a first pressure (about 10 psi to about 149 psi) into the enclosed reactor column(s) to dissolve the nickel to produce a solution. Oxygen containing gas is introduced into the solution at a second pressure (about 11 to about 150 psi) above the first pressure to produce a nickel sulfate solution having nickel sulfate and water. The solution of nickel sulfate and water is collected. Preferably, the nickel sulfate solution has a nickel metal concentration of about 10 weight %. If the concentration of nickel metal is above 10 weight %, water may be added to achieve the preferred nickel metal concentration. If the concentration of nickel metal is below 10 weight %, water may be evaporated to achieve the preferred nickel metal concentration. Then the nickel sulfate may be converted to nickel hydroxide. Preferably, the sulfuric acid is added continuously to maintain stoichiometry within said at least one enclosed container. Preferably, nickel metal is continually added to the reactor column(s) to keep the reaction going. In a preferred embodiment, four or more reactor columns are connected in series between a pump and a sulfuric acid container and oxygen containing gas is introduced into the solution between the pump and the first of the four reactor columns. However, the oxygen containing gas may be introduced into the solution at any point to facilitate the reaction, such as between the pump and a sulfuric acid container.

Another embodiment of the invention discloses a process for converting bulk nickel to nickel sulfate comprising providing at least one enclosed reactor column containing bulk nickel, the bulk nickel having an average size of at least 0.1 mm and introducing sulfuric acid at a first pressure (about 10 psi to about 149 psi) into the enclosed reactor column(s), the sulfuric acid having a concentration sufficient to dissolve the bulk nickel. Next, oxygen containing gas is introduced at a second pressure (about 11 to about 150 psi) above the first pressure to produce nickel sulfate solution that may be concentrated by evaporation and collected. A pump may be used to pump sulfuric acid to reactor column (s) from a sulfuric acid container. After sulfuric acid has been pumped through the reactor column(s) and the desired reaction has occurred, the solution of nickel sulfate and water may be pumped back to the sulfuric acid container for collection. Preferably, the sulfuric acid is added continuously to maintain stoichiometry within enclosed reactor column(s). In a preferred embodiment, the reactor column(s) are heated to a temperature between 90° C. to 95° C. to heat the sulfuric acid and bulk nickel to facilitate the desired reaction to produce a nickel sulfate solution.

An embodiment of the present invention provides a process for converting nickel into nickel sulfate without liberation volatile hydrogen gas into the atmosphere.

An embodiment of the present invention provides a continual closed loop process of converting bulk nickel into nickel sulfate without producing hydrogen gas.

An embodiment of the present invention provides a process for converting bulk nickel metal into nickel sulfate by dissolving nickel metal in sulfuric acid while adding oxygen containing gas to produce nickel sulfate in water. Then, the nickel sulfate may be converted to nickel hydroxide.

BRIEF DESCRIPTION OF THE DRAWINGS

In order to assist in the understanding of the various aspects of the present invention and various embodiments thereof, reference is now made to the appended drawings, in which like reference numerals refer to like elements. The drawings are exemplary only, and should not be construed as limiting the invention.

DETAILED DESCRIPTION OF THE INVENTION

A preferred embodiment of the present invention provides a method of converting nickel metal into nickel sulfate. Nickel metal is combined with sulfuric acid and oxygen containing gas, such as $O_2$ gas, air or a mixture thereof, to produce nickel sulfate solution as illustrated in the following chemical equation.

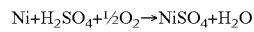

$$Ni+H_2SO_4+\tfrac{1}{2}O_2 \rightarrow NiSO_4+H_2O$$

Using the novel process disclosed herein the above reaction produces nickel sulfate dissolved in water with a slight evaporation of the water. The nickel sulfate is filtered and sulfuric acid is continually added to maintain stoichiometry within the container until all the nickel is dissolved.

Figure 4:
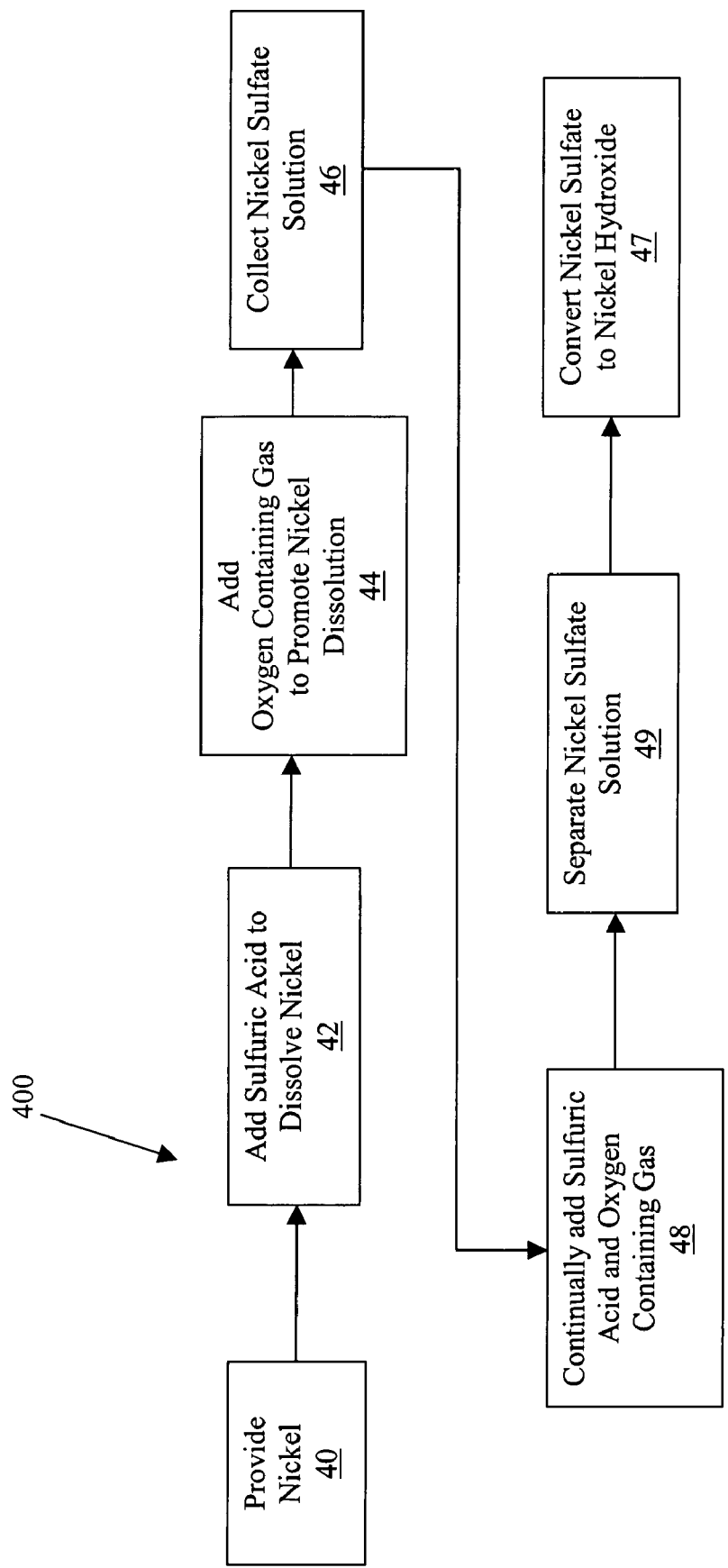
FIG. 4 is a process flow diagram of a process for preparing nickel hydroxide in accordance with the present invention, wherein oxygen containing gas is introduced after the sulfuric acid.

FIG. 4 is a block diagram that illustrates a preferred embodiment of the novel process described herein generally depicted as 400. Nickel is provided 40, preferably in at least one corrosion resistant reactor column due to the acidity of the sulfuric acid. Similarly, the flow lines, pump and acid container should be resistant to corrosion caused by sulfuric acid. The sulfuric acid is added 42 to the reactor column from an acid container, preferably the concentration of the sulfuric acid is from about 1% to about 30%, more preferably about 7% to about 30%. However, the concentration of the sulfuric acid may be higher or lower than the preferred range, so long as the desired reaction occurs and the appropriate pH is maintained. A pH of about 0.1 to 6.0 is preferable in the sulfuric acid container, a pH of 2.5 to 4.0 is most preferable. Water may be added to adjust the pH. The temperature of the reactor column(s) is preferably 20° C. to 100° C., a temperature of 90° C. to 95° C. is most preferable. After the sulfuric acid begins to react with the nickel, oxygen containing gas is provided 44 to produce the desired chemical reaction above.

The nickel sulfate solution is collected 46 in a collection receptacle. In a preferred embodiment, the sulfuric acid container may also act as the collection receptacle. Preferably, the nickel sulfate solution has a nickel metal concentration of about 10 weight %. If the concentration of nickel metal is above 10 weight %, water may be added to achieve the preferred nickel metal concentration. If the concentration of nickel metal is below 10 weight %, water may be evaporated to achieve the preferred nickel metal concentration.

Figure 5:
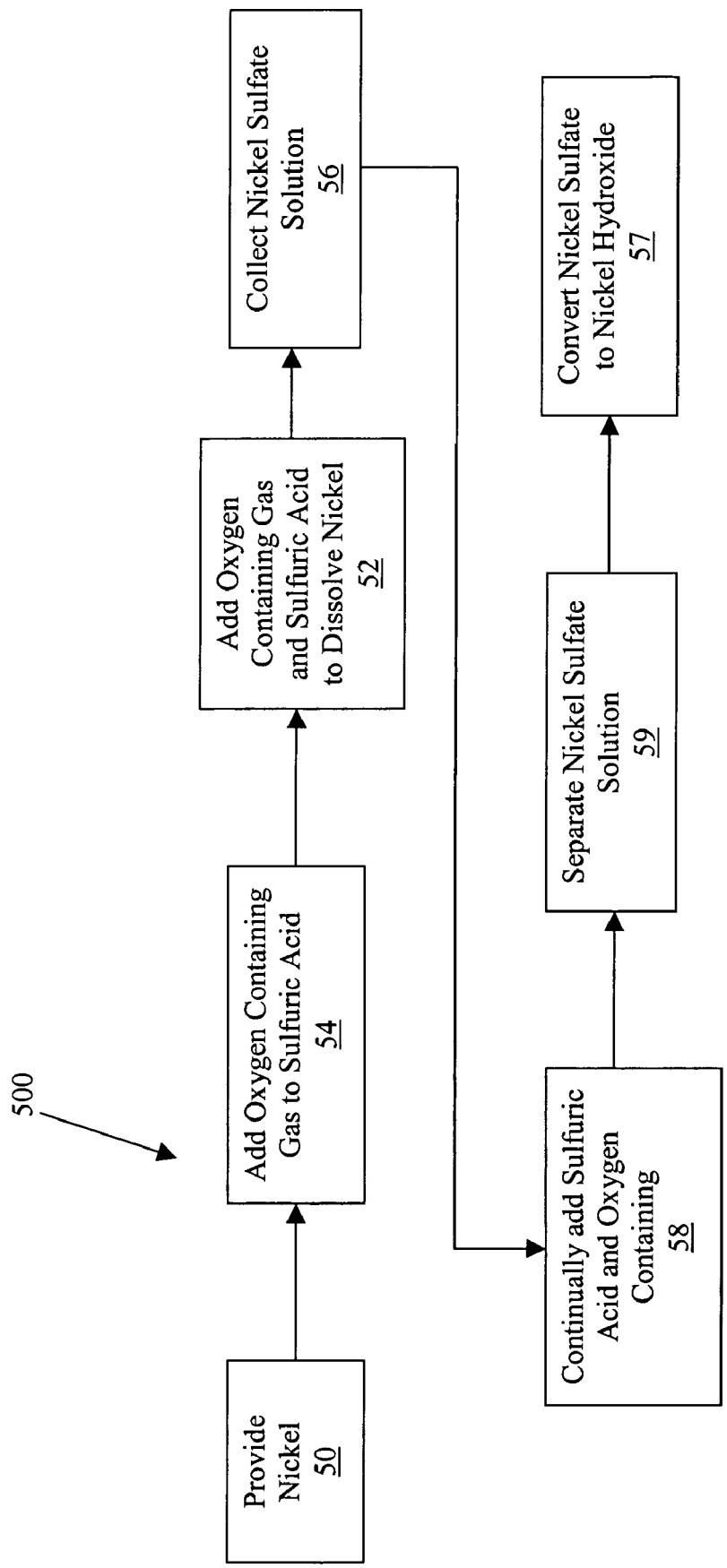
FIG. 5 is a process flow diagram of a process for preparing nickel hydroxide accordance with the present invention, wherein oxygen containing gas is introduced before the sulfuric acid.

Sulfuric acid and oxygen containing gas may be continually introduced 48 until all the nickel has been dissolved. Water may be evaporated from the nickel sulfate solution 49 to precipitate a nickel sulfate solid. The nickel sulfate solid is separated from the solution by any suitable separation process, such as filtration, decantation, etc. FIG. 5 is a block diagram that illustrates an embodiment of the novel process described herein generally depicted as 500. In the embodiment of FIG. 5, oxygen containing gas is introduced 54 before the sulfuric acid is introduced 52. Although reactor columns are described, any reactor may be used to produce the desired reaction.

Figure 6:
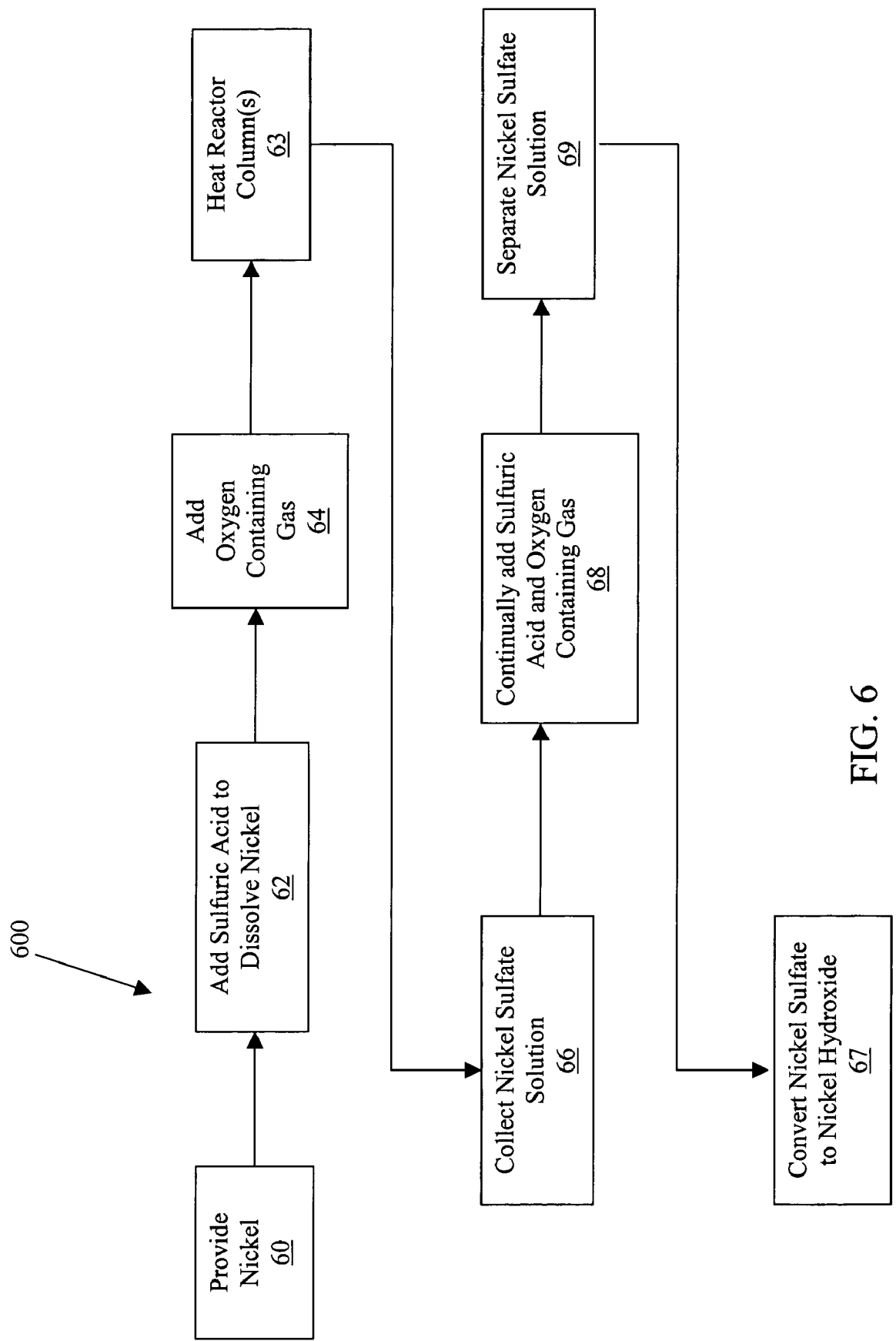
FIG. 6 is a process flow diagram of a process for preparing nickel hydroxide in accordance with the present invention, wherein the collection receptacle is heated.

Preferably, the reactor column(s) is(are) heated 63 to increase the rate of the reaction in the column(s), referring to the block diagram of FIG. 6. In a preferred embodiment, the inside temperature of the column(s) is(are) heated to a temperature of between 90° C. and 95° C. The column(s) may be heated by any applicable heating source, such as but not limited to a hot plate, steam or wrap around heating coil. Preferably, steam is used to heat the column(s). It should be noted that the heating step 63 of FIG. 6 may occur at any point in the process to speed the rate of reaction, however, the heating step preferably occurs before the desired reaction that produces nickel sulfate begins. The rate of dissolving the nickel metal is dependent on the size the reactor column and percent filled with nickel, temperature, pH, and oxygen flow and dispersion. Preferably, the rate of dissolving the nickel metal is greater than 0.1 g/s.

Figure 7:
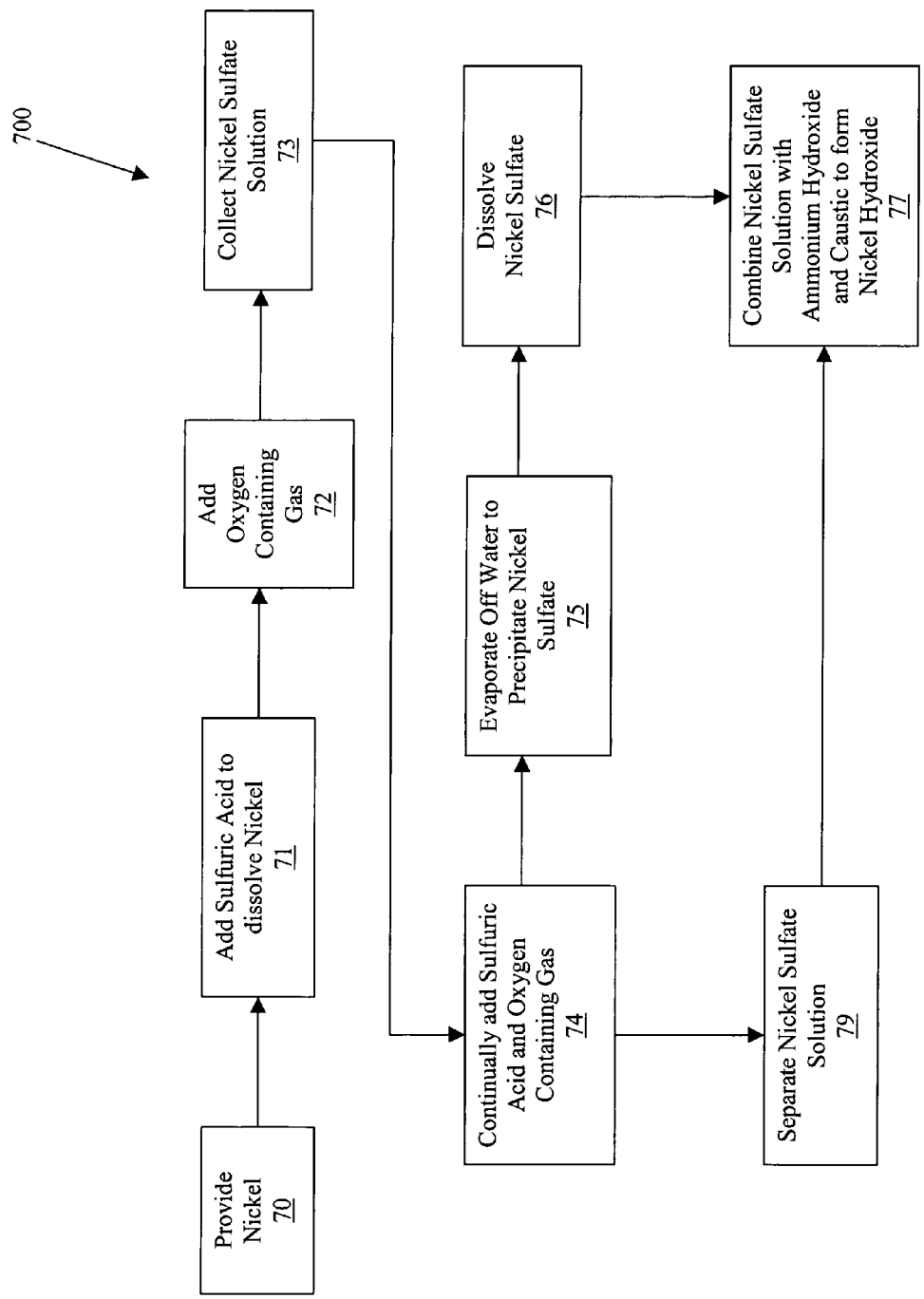
FIG. 7 is a process flow diagram of a process for preparing nickel hydroxide in accordance with the present invention.

After the nickel sulfate solution having the desired nickel metal concentration is produced, the nickel sulfate solution may be converted to nickel hydroxide for use as a positive electrode material. The nickel sulfate solution may then be converted to nickel hydroxide using a process such as those described in U.S. Pat. No. 6,444,363 issued to Benet et al. on Sep. 3, 2002 and U.S. Pat. No. 6,432,580 issued to Fierro et al. on Aug. 13, 2002, both of which are hereby incorporated herein by reference. Referring to FIG. 7, water in the nickel sulfate solution may be evaporated to increase the concentration of the nickel sulfate solution, if necessary, or to precipitate the nickel sulfate crystal 75 then dissolve in water to form aqueous nickel sulfate 76 to purify the nickel sulfate solution and make suitable for the production of nickel hydroxide. In a preferred embodiment, the aqueous nickel sulfate solution, purified 75 and 76 or separated 79, is used to form high quality nickel hydroxide material. Nickel hydroxide material is preferably prepared by simultaneously combining the nickel sulfate solution, sodium hydroxide and ammonium hydroxide in a single reaction vessel to form nickel hydroxide particles 77. The combined solution is preferably continuously and rapidly stirred or agitated. Nickel hydroxide particulates are grown at a temperature and a pH that readily precipitates nickel hydroxide upon formation. However, the above preferred process for converting nickel sulfate to nickel hydroxide is exemplary only and any suitable process for converting nickel sulfate to nickel hydroxide may be utilized.

The size of the nickel introduced into reactor column(s) may be in the range from 1 μm to several meters or any size compatible with the reactor column(s). Preferably, bulk nickel, i.e. nickel having an average size greater than greater than 0.1 mm, is used. Additionally, nickel scrap or nickel squares may also be used. However, nickel with contaminants may be used, but contaminants may interfere with the reaction and the desired results and may require additional purification steps, such as crystalliztion of the nickel sulfate crystal and redissolving to produce a preferred nickel sulfate solution, described in FIG. 7. The pressure of the sulfuric acid introduced into the system may be in the range of about 10 psi to about 149 psi. The preferred pressure of the sulfuric acid may be in the range of about 11 psi to about 150 psi, because the higher pressure reduces the time necessary for the process. The pressure of the oxygen containing gas introduced into the system is preferably greater than the pressure of the sulfuric acid to promote the desired chemical reaction. A more preferred pressure of the oxygen containing gas is at least 2 psi greater than the working pressure of the sulfuric acid solution circulating through the reactor. The concentration of the sulfuric acid should be sufficient to dissolve the nickel and promote the chemical reaction above. The preferred concentration of the sulfuric acid solution is from about 7% $H_2SO_4$ to about 30% $H_2SO_4$.

Figure 1:
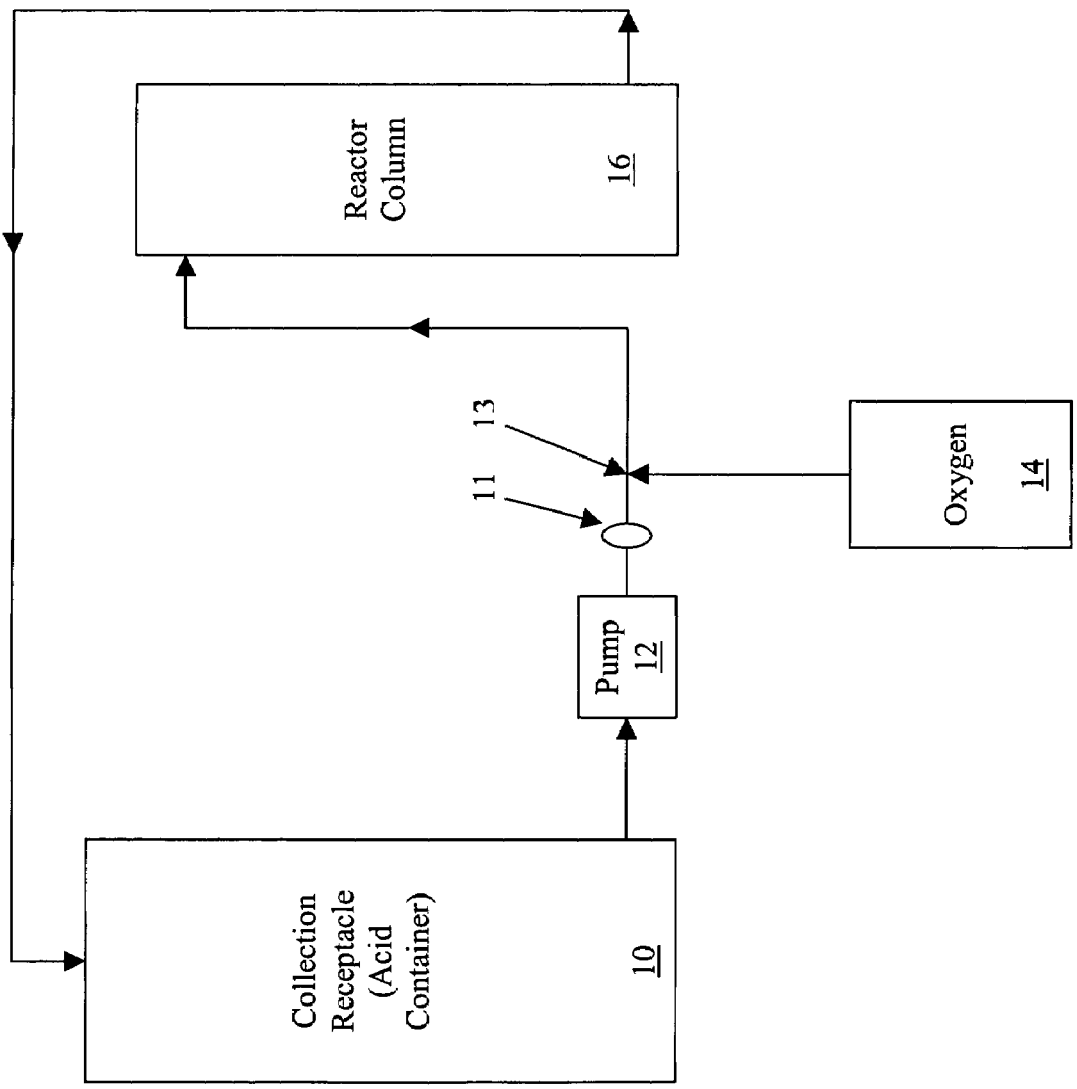
FIG. 1 is an illustration of an apparatus that may be used to conduct the process of the disclosed invention that utilizes one reactor column.
Figure 2:
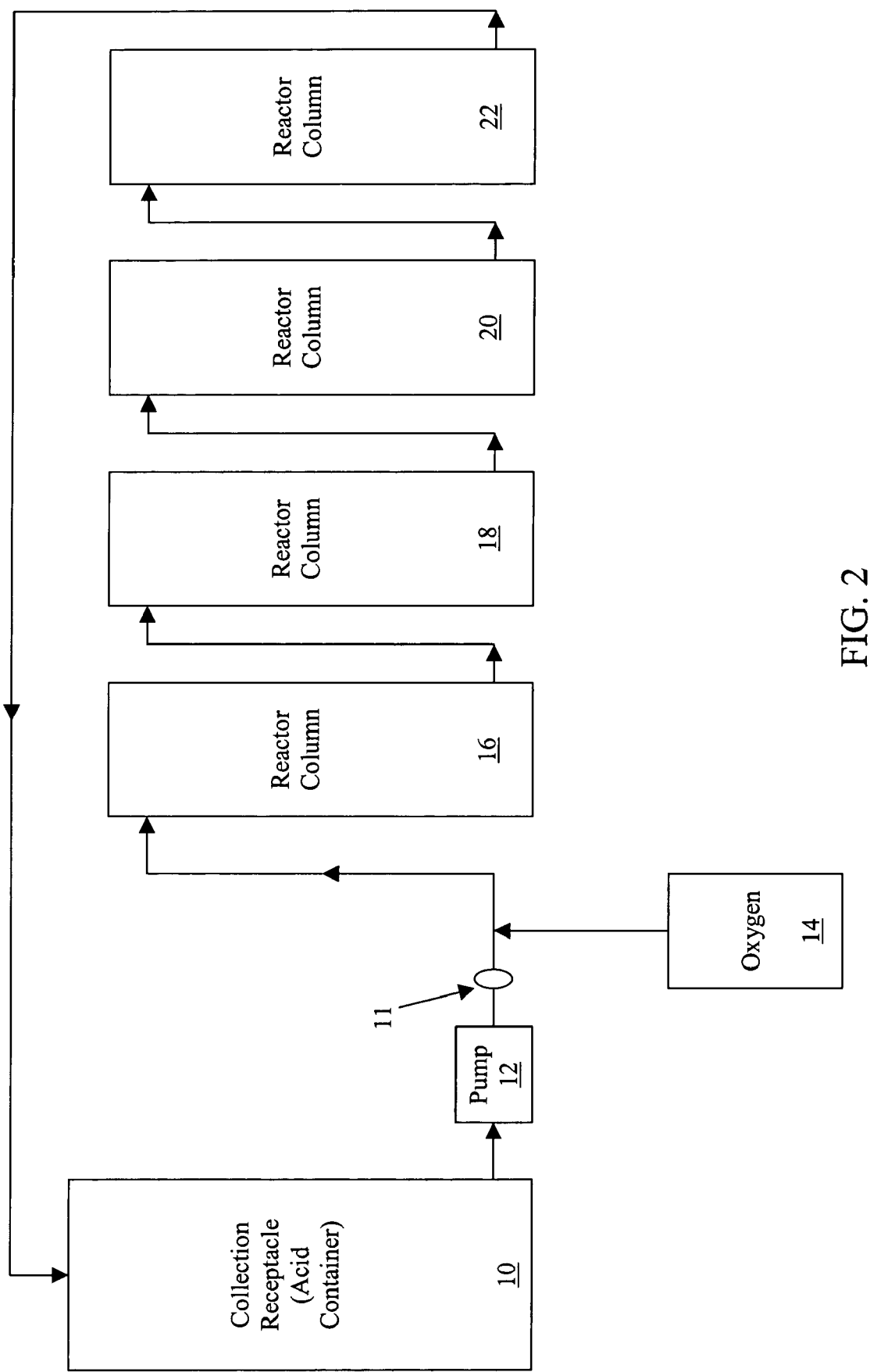
FIG. 2 is an illustration of an apparatus that may be used to conduct the process of the disclosed invention that utilizes four reactor columns.

Referring to FIG. 1, an acid container 10 is filled with sulfuric acid and at least one reactor column 16 filled with nickel. Preferred construction materials for reactor column 16 include but are not limited to steel coated with polytetrafluoroethylene (PTFE), polyvinylidene fluoride (PVDF), chlorinated polyvinyl chloride (CPVC), synthetic rubber such as VITON®, or fiberglass. When more than one rector column is employed, the reactor columns 16, 18, 20 and 22 are connected in series, as illustrated in FIG. 2. A valve 11 between the pump 12 and the intersection 13 of the line from the pump 12 and the oxygen containing gas inlet is opened, the pump 12 is started and the sulfuric acid begins to flow through each reactor column 16. Optionally, the valve 11 may be positioned between the acid container 10 and the pump 12, as illustrated in FIG. 2. The sulfuric acid is pumped into the reactor column 16 near the top portion of the reactor column 16. As the sulfuric acid contacts the nickel, the nickel dissolves to produce a solution. The level of liquid in each reactor column 16 should be kept at or above the level of the inlet 15 to the reactor column 16. The solution is forced out near the bottom portion of the reactor column 16 through an outlet 17 and transferred to a collection receptacle 10. Preferably, the acid container 10 also acts as the collection receptacle. This embodiment enables any unreacted sulfuric acid to continually flow through the system and eventually react with nickel metal. As the solution begins entering the collection receptacle 10, oxygen containing gas is introduced into the solution at any point in the flow pattern. Preferably, the oxygen containing gas is introduced into the solution between the pump and the first reactor column. The oxygen containing gas may be introduced from an oxygen tank 14. As the oxygen reacts with the solution, nickel sulfate and water are pumped through the system and collected in the collection receptacle 10. The process preferably continues until most of the sulfuric acid has reacted to form a nickel sulfate solution. Preferably, an excess amount of nickel is provided and all the sulfuric acid reacts before all the nickel dissolves. To retrieve the nickel sulfate crystals, if desired, the composition of nickel sulfate and water may be heated and the water evaporated, leaving nickel sulfate powder.

Figure 3:
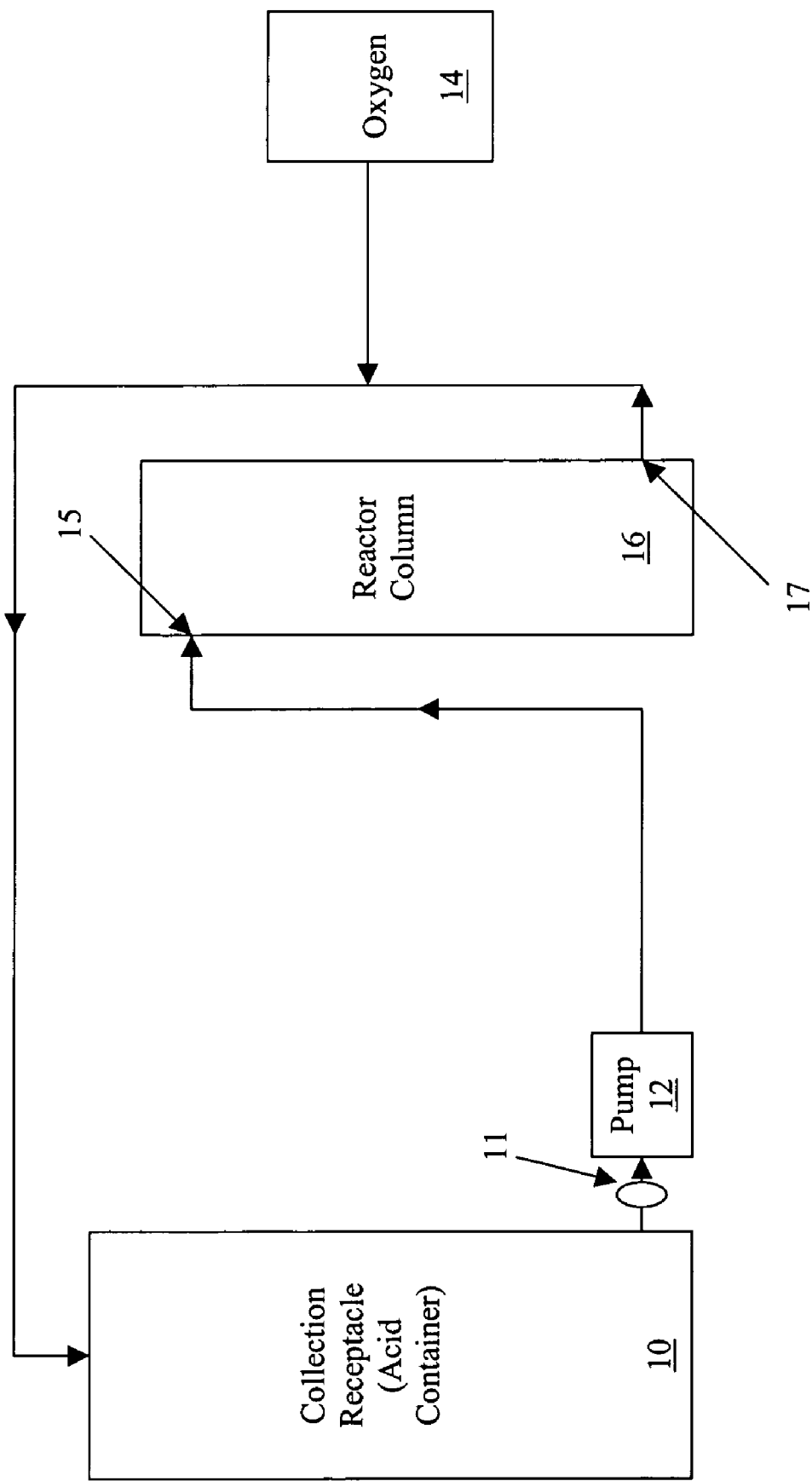
FIG. 3 is an illustration of an apparatus that may be used to conduct the process of the disclosed invention wherein oxygen containing gas is introduced between a reactor column and a collection receptacle.

Several reactor columns may be used, as illustrated in FIG. 2 wherein four reactor columns 16, 18, 20 and 22 are utilized. The use of multiple columns increases residence time to result in faster production of the nickel sulfate solution. This preferred embodiment allows more sulfuric acid to react with nickel and form solution before returning the collection receptacle 10. FIG. 3 illustrates another embodiment of the invention disclosed herein. The oxygen containing gas is introduced into the solution at a point between the last column 16 and the collection receptacle 10.

EXAMPLE

The following experiment was performed using one reactor column comprised of steel covered with PTFE with the embodiment illustrated in FIG. 1. The reactor column was 7 feet high with an inner diameter of 2 inches. The nickel pellets set into the reactor column were 99.99% nickel and had an average size of 0.254 to 3.81 cm (0.1 to 1.5 inches) in diameter. The weight of the nickel pellets set into the reactor column was about 25 pounds. The sulfuric acid container/collection receptacle was set onto a hot plate and the contents heated to a temperature of between about 90° C. to about 95° C. About 0.5 gallons of sulfuric acid was poured into the sulfuric acid container/collection receptacle. The pH of the sulfuric acid container/collection receptacle was maintained at pH of 2.5-4.0. The sulfuric acid was introduced at a pressure of 100-150 psi. The oxygen was introduced into the sulfuric acid between the pump and the reactor column at a pressure of 101-151 psi. The sulfuric acid and oxygen containing gas flowed into the reactor column containing the nickel pellets. The reaction continued for approximately 15 hours until the concentration of nickel sulfate exceeded the weight % of nickel. The nickel sulfate was separated from the solution and about 1.8 kg of nickel was retrieved in solution.

While the invention has been illustrated in detail in the drawings and the foregoing description, the same is to be considered as illustrative and not restrictive in character as the present invention. It will be apparent to those skilled in the art that variations and modifications of the present invention can be made without departing from the scope or spirit of the invention. For example, the construction material, size and shape of the reactor can be varied without departing from the scope and spirit of the invention. Furthermore, by using one or more of the embodiments described above in combination or separately, it is possible to produce nickel hydroxide from nickel, so that a safer and more efficient process is realized. Thus, it is intended that the present invention cover all such modifications and variations of the invention, that come within the scope of the appended claims and their equivalents.

We claim:

1. A process for converting bulk nickel metal to nickel sulfate comprising the steps of:
   1) providing the bulk nickel metal to a system having at least one enclosed reactor;
   2) supplying sulfuric acid solution to the system;
   3) introducing oxygen into the sulfuric acid solution; and
   4) contacting said oxygen and said sulfuric acid solution with the bulk nickel metal in the at least one enclosed reactor to produce nickel sulfate solution, wherein the sulfuric acid solution is maintained within a pH range of about 0.1 to 6.0.

2. The process of claim 1, wherein the pH range is 2.5 to 4.0.

3. The process of claim 1, wherein the pH range is 0.1 to 6.0.

4. The process of claim 1, wherein the pH range is 0.1 to 4.0.

5. The process of claim 1, wherein 1.8 kg of bulk nickel is converted to nickel sulfate.

6. The process of claim 1, wherein the temperature of the at least one enclosed reactor is maintained at 20 to 95 degrees Celsius.

7. The process of claim 6, wherein 1.8 kg of bulk nickel is converted to nickel sulfate.

8. The process of claim 1, wherein oxygen gas is introduced into the sulfuric acid at a first pressure and sulfuric acid is supplied to the system at a second pressure.

9. The process of claim 8, wherein the first pressure differs from the second pressure by an amount between 1 psi and 140 psi.

10. The process of claim 8, wherein the first pressure is in a range of about 10 psi to about 149 psi and the second pressure is in a range of about 11 psi to about 150 psi.

11. The process of claim 1, wherein the bulk nickel metal has an average size greater than 0.1 mm.

12. The process of claim 1, wherein the bulk nickel metal has an average size of 0.254 cm in diameter.

13. The process of claim 1, wherein the bulk nickel metal has an average size of 0.254 cm to 3.81 cm in diameter.

14. The process of claim 1, wherein the bulk nickel metal comprises 99.99% nickel.

15. The process of claim 1, wherein said nickel sulfate solution has a nickel metal concentration of about 10 weight percent.

16. The process of claim 1, wherein said step of supplying oxygen to the system comprises supplying air to the system.

17. A process for converting bulk nickel metal to nickel sulfate comprising the steps of:
   1) providing the bulk nickel metal to a system having at least one enclosed reactor;
   2) supplying sulfuric acid solution the system;
   3) introducing oxygen into the sulfuric acid solution; and
   4) contacting said oxygen and said sulfuric acid solution with the bulk nickel metal in the at least one enclosed reactor wherein the at least one enclosed reactor is maintained at a temperature of 20 degrees Celsius to 95 degrees Celsius.

18. The process of claim 17, wherein 1.8 kg of bulk nickel is converted to nickel sulfate.

19. The process of claim 17, wherein the bulk nickel metal has an average size greater than 0.1 mm in diameter.

20. The process of claim 17, wherein the bulk nickel metal has an average size of 0.254 cm in diameter.

21. A continuous process for converting bulk nickel metal to nickel sulfate comprising the steps of:
   1) providing bulk nickel metal to a system having at least one enclosed reactor;
   2) supplying sulfuric acid solution to the system;
   3) introducing oxygen into the sulfuric acid solution; and
   4) contacting the oxygen and the sulfuric acid solution with the bulk nickel metal in the at lease one enclosed reactor, wherein the sulfuric acid solution is maintained within a pH range of about 0.1 to 4.0 and the at least one enclosed reactor is maintained at a temperature of 20 degrees Celsius to 100 degrees Celsius.

* * * * *